(12) United States Patent
Lee

(10) Patent No.: US 11,485,890 B2
(45) Date of Patent: Nov. 1, 2022

(54) DEICING AND SNOW MELTING COMPOSITIONS AND METHODS OF USE

(71) Applicant: Jong Soo Lee, North Brunswick, NJ (US)

(72) Inventor: Jong Soo Lee, North Brunswick, NJ (US)

(*) Notice: Subject to any disclaimer, the term of this patent is extended or adjusted under 35 U.S.C. 154(b) by 0 days.

(21) Appl. No.: 17/509,062

(22) Filed: Oct. 24, 2021

(65) Prior Publication Data

US 2022/0041910 A1 Feb. 10, 2022

Related U.S. Application Data

(63) Continuation-in-part of application No. 16/637,079, filed as application No. PCT/US2019/035514 on Jun. 5, 2019, now Pat. No. 11,155,736.

(60) Provisional application No. 62/713,962, filed on Aug. 2, 2018.

(51) Int. Cl.
*C09K 3/18* (2006.01)

(52) U.S. Cl.
CPC .................. *C09K 3/185* (2013.01)

(58) Field of Classification Search
None
See application file for complete search history.

(56) References Cited

U.S. PATENT DOCUMENTS

| | | | |
|---|---|---|---|
| 2006/0060664 A1* | 3/2006 | Valiton | E04D 13/103 239/142 |
| 2017/0198183 A1* | 7/2017 | Mello | B65D 65/46 |
| 2020/0017739 A1* | 1/2020 | Scherrer | C09K 3/149 |

* cited by examiner

*Primary Examiner* — Jeffrey D Washville
(74) *Attorney, Agent, or Firm* — Brooklyn Law Incubator & Policy Clinic; Serge Krimnus; Milena Lai

(57) ABSTRACT

A deicing and snow melting device, for elevating the melting point of ice and snow, comprises of a plurality of pellets including an active ingredient. Each pellet of the plurality of pellets has at least an underside and a topside. The active ingredient is selected from the group consisting of chloride salts, organic compounds, alcohols or mixtures thereof. A base comprising a water-soluble sheet is joined to either one of the underside or topside of each pellet of the plurality of pellets. The base may define at least one hole through a top surface and bottom surface of the base allowing for easy dispersion of the active ingredient

20 Claims, 8 Drawing Sheets

DEICING AND SNOW MELTING COMPOSITIONS AND METHODS OF USE

FIELD OF INVENTION

The present invention relates to methods and compositions for safely and conveniently melting ice and snow from surfaces, including driveways, walkways and roads, as well as the roofs of buildings and vehicles.

INTRODUCTION

The most common method of removing snow and ice from, e.g., a driveway is through the use of shovels. However, this method is very time-consuming, physically difficult and potentially dangerous to the shoveler's health. Another method includes the use of a plow. However, plows are expensive to own, so people usually hire a plowing service on a per snowfall basis—but this can be costly, and there is no guarantee when (or if) the snow plow will plow the driveway. Moreover, plows may not be able to remove all the snow and ice, so that a very thin layer may remain—which may then freeze, leading to hazardous conditions. Further, as most plows are attached to vehicles, and most vehicles burn gasoline and use oil, the use of plows is not the most environmentally-friendly method of removing snow. A third method of removing ice and snow involves chemical removal, such as by spreading one or more types of chloride salt. However, while chloride salts are relatively inexpensive, in large amounts they can be harmful to the soil, may kill lawns and other plant life and may be corrosive to metal objects (such as vehicles). Moreover, it can be difficult to uniformly spread chloride salts evenly across a surface; rather, the chloride salts can clump together in piles across the surface. A fourth method involves the use of heat, such as through the installation of heating elements under a driveway in order to heat the driveway and melt snow and ice. However, such a method may require an installation that involves destroying an existing driveway and can be very expensive (in terms of both energy use and installation costs).

Liquid compositions that include potassium acetate to deice planes at airports may be used; however, such compositions must be sprayed on the planes in great quantities and so they are inconvenient to store and use in residential, commercial and vehicular applications.

Therefore, an inexpensive, environmentally-friendly and safe composition that could be easily and quickly deployed in order to melt snow and ice from various surfaces would advance the art.

SUMMARY

Embodiments of the present invention address these and other deficiencies by providing a device comprising i) a plurality of pellets that each comprise at least one active ingredient, and ii) a base comprising water-soluble film-forming material(s), wherein the plurality of pellets is attached to the base.

The active ingredient in the pellets is preferably potassium acetate; however, the active ingredient may also include one or more (either alone or combined with potassium acetate) of any compound that is known, either now or in the future, to melt snow and ice. While potassium acetate is especially preferred, other preferred compounds include chloride salts, such as sodium chloride, magnesium chloride, calcium chloride and potassium chloride; organic compounds, such as calcium magnesium acetate, potassium acetate, potassium formate, calcium formate, urea and agricultural by-products; or alcohols, diols and polyols, such as methanol, ethylene glycol, propylene glycol and glycerol; and any derivatives thereof. Other ingredients that may be included in the pellets include water; corrosion inhibitors such as triazoles (including tolytriazole, benzyltriazole and benzotriazole), alcohols (including propargyl alcohol), nitrites (including sodium nitrite), nitrates (including sodium nitrate), silicate salts (including sodium silicate and potassium silicate), various other inorganics (including potassium phosphate and borax), various other organics (including sodium benzoate, phosphate esters and thiourea), and ethanolamines (including monoethanolamine, diethanolamine and triethanolamine); coloring agents of any color (including red, orange, yellow, green, blue, indigo, violet, white, brown, black and grey, as well as shades, hues and tints thereof) and various other excipients such as glidants, binders and lubricants. In some embodiments, the pellets may include ingredients such as acrylic acid polymers, natural gums, alcohol ethoxylates, alkylbenzene sulfonates, alkylphenol ethoxylates, alkylphenols, diamines, polyethylene oxide monomers, polyethylene oxide polymers. In some embodiments, the pellets may include pH buffers (including phosphate-based pH buffers); pH reducers; antifoaming agents (including silicones); hydrophobic agents; solvents (including various alcohols); plasticizers; degradation agents and emulsifiers. In a preferred embodiment, potassium acetate is the only ingredient in the pellet. It is envisioned that all the pellets in a device have either the same, or different, compositions.

The pellets are preferably formed through a compression technique whereby the ingredients are combined and then compressed in a compression machine, such as a tablet press and the like; if there is only one ingredient, then that ingredient is compressed in a compression machine, such as a tablet press and the like. However, the pellets may also comprise granules, spheres or cores comprising the ingredient(s), wherein the granules, spheres or cores are encapsulated.

The base may be any material that dissolves in water, including materials such as gelatin, certain papers such as certain rice papers, and various polymers such as polyvinyl alcohol. Such water-soluble material may also form the encapsulation material if the pellet is formed of encapsulated granules, spheres or cores. The base (or encapsulation material) may include excipients known to those in the art, including coloring agents of any color (including red, orange, yellow, green, blue, indigo and violet, as well as shades, hues and tints thereof) and various other excipients such as glidants and lubricants; a particularly preferred excipient is a thickener, such as gluten, sugars or starches.

The pellets may be affixed to the base by any method known to those in the art. For example, the base may be formed as a sheet (either a solid sheet or a sheet with cutouts, where such cutouts may be made with a hole puncher, laser, or by any other method known to those in the art, so that it has the appearance of, e.g., being woven). The pellets may then be disposed between two layers of sheets (with the sheets adhered to each other by any known means, such as through acceptable adhesives such as organic glues, laser adhesion, or heat sealing). The pellets may also be applied to the sheet while the sheet is in a semi-molten form, e.g., while being produced—the pellets are therefore embedded in the sheet.

The pellets may also include one or more center or off-center holes whereby ribbons of the base are interwoven between the plurality of pellets.

It is also possible that the ingredients are not compressed or encapsulated into pellet form. In this instance, the various ingredients are mixed together and then mixed with a solution of the base (if only one ingredient, it is mixed with a solution of the base); the resulting solution is then formed into sheets and cooled. Alternatively, the various ingredients are mixed together and then, while the base is semi-molten and being formed into a sheet, the ingredients (or the single ingredient) are sprinkled over the base. In these two ways, the ingredients are embedded throughout the base sheet. In another embodiment, an acceptable adhesive is applied to the base and then the ingredients are sprinkled over the base and, therefore, adhere to the base. In some embodiments, pellets may be affixed or secured to a base wherein the base has the active ingredient either embedded in or adhered thereto.

In some embodiments, the pellets have a thickness of between about 0.01-24 inches, preferably about 0.02-20 inches, more preferably about 0.03-18 inches. In some embodiments, the pellets have a thickness of between about 0.1 inches and 2 inches, preferably about 0.2 inches and 1.5 inches, even more preferably between about 0.25 inches and 1 inch. In some embodiments, the pellets may have a thickness of about 0.1 inches, about 0.125 inches, about 0.2 inches, about 0.25 inches, about 0.3 inches, about 0.375 inches, about 0.4 inches, about 0.5 inches, about 0.6 inches, about 0.625 inches, about 0.7 inches, about 0.75 inches, about 0.8 inches, about 0.875 inches, about 0.9 inches, and/or about 1.0 inches; in some embodiments, the pellets may have a thickness in a range of between any of these values. It is envisioned that all the pellets in a device have either the same, or different, thicknesses. In some embodiments, the pellets have a length and width (or diameter, depending on the pellet shape) that are the same or different from each other (and from the thickness). In some embodiments, the length and/or width (or diameter, depending on the pellet shape) is from about 0.5-12 inches, preferably about 1-9 inches, more preferably about 1.5-6 inches, even more preferably about 2-5 inches, yet even more preferably about 2-4 inches, and most preferably about 2-3 inches. In some embodiments, the length and/or width (or diameter, depending on the pellet shape) is about 2 inches, about 2.5 inches or about 3 inches; about 2.5 inches is most preferred. It is envisioned that all the pellets in a device have either the same, or different, lengths and/or widths (or diameters, depending on the shape).

In the instance where the base is formed as a sheet or from interwoven ribbons, the sheet or ribbons may include perforations at regular intervals so that a device may be cut into smaller dimensions. Such perforations may be made with a hole puncher, laser, or by any other method known to those in the art. In one embodiment, a device has an overall length of about 10-80 feet, preferably about 20-70 feet, more preferably about 30-60 feet, even more preferably about 40 feet. In the same or a different embodiment, a device has width-wide perforations at about every 6-36 inches, preferably at about every 12-24 inches, more preferably at about every 15 inches.

In some instances, the device is sized to fit the width of a sidewalk or vehicle. Several such devices may be used to fit the width of a driveway. In one embodiment, a device has a width of about 6-36 inches, preferably about 12-24 inches, more preferably about 12-18 inches. In the same or a different embodiment, a device has a length of about 6-48 inches, preferably about 12-36 inches, more preferably about 18-36 inches, even more preferably about 24 inches.

In some embodiments, the device may include a relatively rigid skeleton (such as an outer border or internal support structures, or a combination of both) to enable easy handling. In these embodiments, the skeleton should be comprised of any material that dissolves in water, including materials such as gelatin, certain papers such as certain rice papers, and various polymers such as polyvinyl alcohol; however, such materials need to be prepared so that they exhibit sufficient rigidity to allow for easy handling and manipulation. In some embodiments, the skeleton comprises a polyvinyl alcohol that is thicker (and, therefore, has a higher tensile strength) than the polyvinyl alcohol in the base. In still other embodiments, the entire base may be relatively rigid and act as the skeleton.

The device may be placed on a sidewalk, walkway, driveway, vehicle or other surface either prior to snowfall, during snowfall or after snowfall. The device should melt at least about 1 inch of snow per hour, preferably at least about 2 inches of snow per hour, more preferably at least about 3 inches of snow per hour, even more preferably at least about 4 inches of snow per hour, yet even more preferably at least about 5 inches of snow per hour, and most preferably at least about 6 inches of snow per hour. The total amount of snow melted by a single device depends on the amount of active ingredient present in each pellet individually and in the device as a whole. If needed, a second (or third, etc.) device can be used during snowfall if required based on the type of snow (e.g., dry, powdery, wet, heavy, etc.) or the rate of snowfall. It is envisioned that, e.g., one device may be placed on top of another device prior to snowfall so that the amount of snow that can be melted is effectively doubled (or three devices may be used to triple the amount of snow that can be melted, etc.). It is also envisioned that after the pellets in the first device have been used up and they and the base have become run-off, then a second device can be placed where the first device had previously been located; a third device, etc., can be placed where the second device had previously been located.

In embodiments that contain potassium acetate as the active ingredient, the pellets contain about 0.1-20 grams potassium acetate. In a preferred embodiment, the pellets contain about 0.5-10 grams potassium acetate; in a more preferred embodiment, the pellets contain about 1-8 grams potassium acetate; in an even more preferred embodiment, the pellets contain about 1.5-6 grams potassium acetate; in yet an even more preferred embodiment, the pellets contain about 2-5 grams potassium acetate; in a most preferred embodiment, the pellets contain between about 3-4 grams potassium acetate. In a preferred embodiment, the pellets contain about 3 grams potassium acetate. It is envisioned that each of the pellets in a device may contain the same, or different, amounts of active ingredient, such as potassium acetate.

In some embodiments, a rounded pellet with a diameter of about 1 inch and a thickness of about 0.25 inches may melt about 6 inches of snow in about 45 minutes.

In an aspect of the present disclosure, the device may include a device for elevating the melting point of ice and snow. The device may include a plurality of pellets which may include an active ingredient. Each pellet within the plurality of pellets may include at least an underside and a topside. The active ingredient may be selected from the group consisting of chloride salts, organic compounds, alcohols or mixtures thereof. The device may also include a base including a water-soluble sheet joined to one of the underside or topside of each pellet of the plurality of pellets. The base may define at least one hole through a top surface and bottom surface of the base allowing for easy dispersion of the active ingredient In an embodiment, each pellet of the plurality of pellets is thermally joined to the base.

In yet another embodiment, each pellet of the plurality of pellets is adhered to the base using an organic glue.

In another embodiment, each pellet of the plurality of pellets has a thickness, which increases along the base.

In yet another embodiment, each pellet of the plurality of pellets contains at least one color additive.

In another embodiment, the base has a border tracing at least one outside edge of the base.

In yet another embodiment, the border is flexible.

In another embodiment, the plurality of pellets contains at least one sugar excipient.

In yet another embodiment, the device has an internal support structure which enables a folded state wherein there are at least two layers of the base.

In another embodiment, the plurality of pellets is made of at least one sugar excipient and a member selected from the chemical group with a crystalline structure including chloride salts, acetates, silicates, and formates.

In yet another embodiment, the crystalline structure is a polycrystalline structure that is capable of fragmenting, aiding in dispersion of the solid organic salt.

In another embodiment, the border is plastic.

In yet another embodiment, the border comprises a water-soluble material.

In another embodiment, the border has an abrasive texture.

In yet another embodiment, the plurality of pellets is made of granules that aid in runoff of the solid organic salt.

In another embodiment, the water-soluble material is less soluble than the plurality of pellets.

In yet another embodiment, each pellet of the plurality of pellets is supplemented with pH buffers tailored to keep a runoff between a pH of 5.5 and 8.5.

In another embodiment, the border is configured to be attached to a second border.

In yet another embodiment, the base includes at least one perforation, the at least one perforation enabling the user to select a desired size of the base.

In another embodiment, the plurality of pellets is composed of at least 5% Sugar and at most 95% Potassium Acetate.

Additional aspects related to this disclosure are set forth, in part, in the description which follows, and, in part, will be obvious from the description, or may be learned by practice of this disclosure.

It is to be understood that both the forgoing and the following descriptions are exemplary and explanatory only and are not intended to limit the claimed disclosure or application thereof in any manner whatsoever.

BRIEF DESCRIPTION OF THE DRAWINGS

The present invention will be better understood when considered in view of the attached drawings, in which like reference characters indicate like parts. The drawings, however, are presented merely to illustrate the preferred embodiment of the invention without limiting the invention in any manner whatsoever.

DETAILED DESCRIPTION

Figure 1:
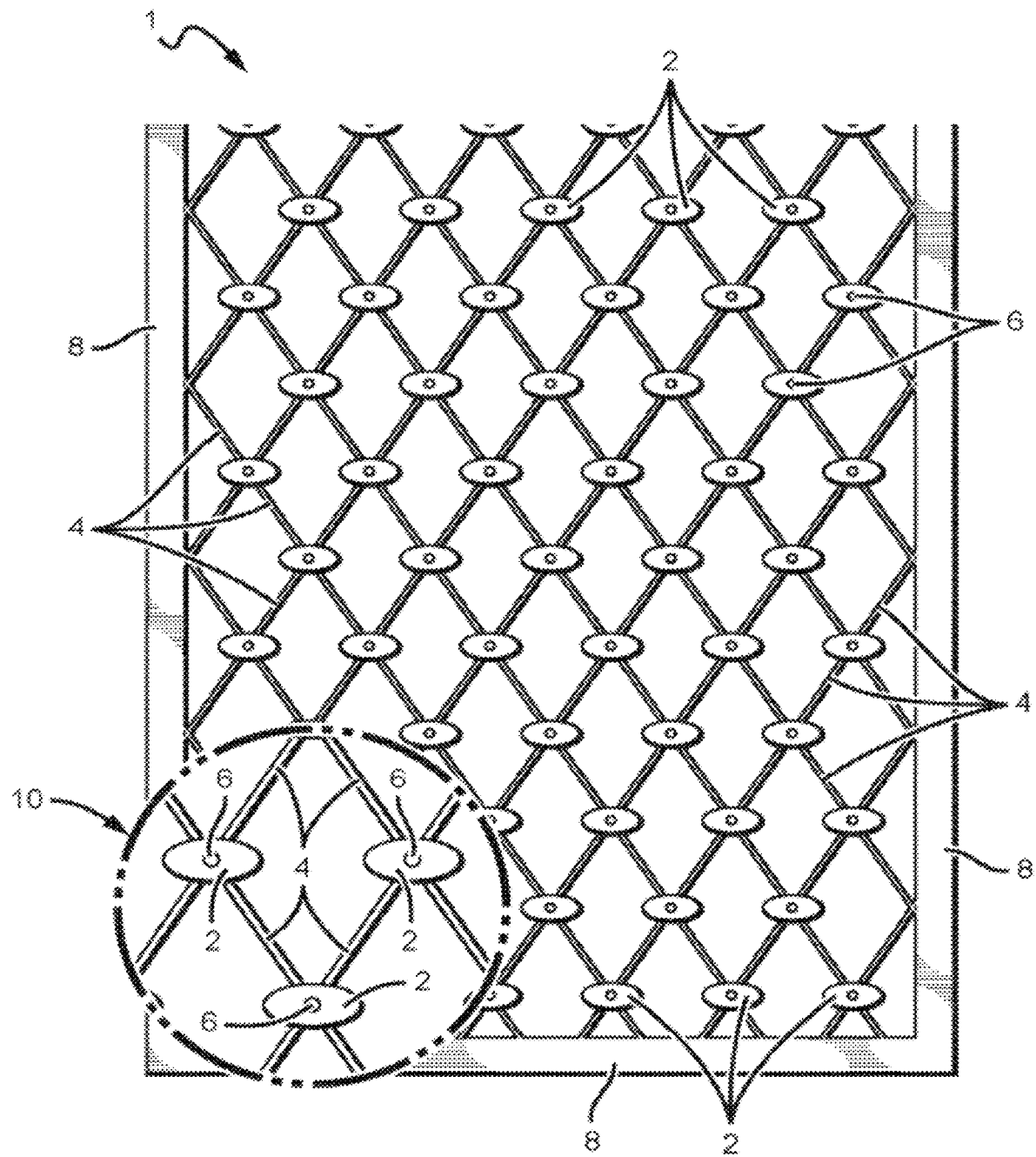
FIG. 1 is a top view of an embodiment of the present disclosure.
Figure 3:
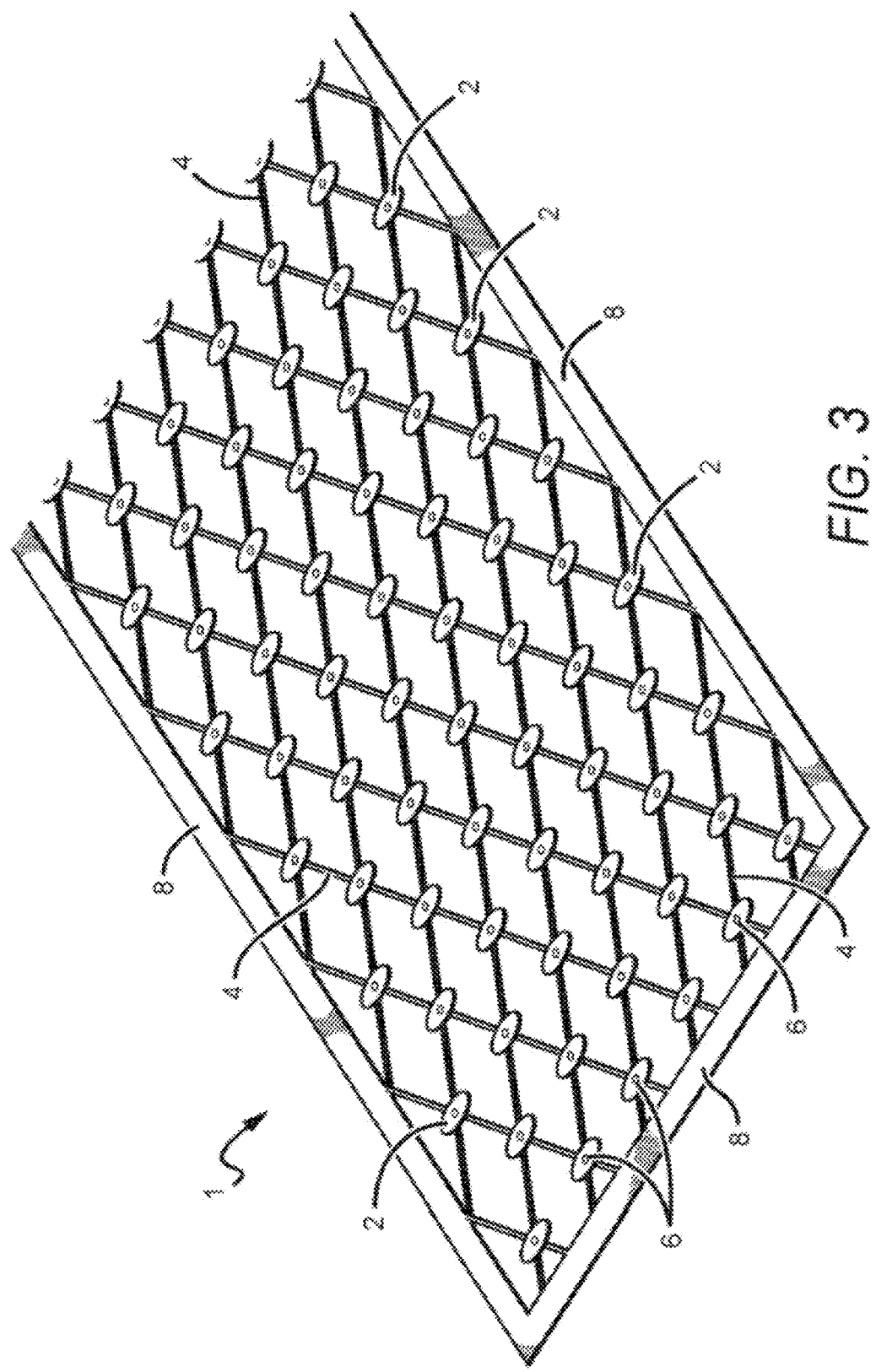
FIG. 3 is a perspective view of the embodiment of FIG. 1.

As shown in FIGS. 1 and 3, the device 1 may include a plurality of pellets 2 connected to base ribbons 4 that are woven together. The base ribbons 4 may be inserted through holes 6 in the pellets 2, or the base ribbons 4 may be attached to the pellets 2 by other means known to those skilled in the art. The base ribbons 4 can also attach to a border 8 which can be the skeleton. A magnified view 10 is also provided. It is preferred that the rigid border 8 be on at least two sides of the device 1, preferably opposing sides; however, the rigid border 8 may also be on two adjacent sides of the device 1. Additionally, the rigid border 8 may also be on the third and/or fourth sides of the device 1. If the device 1 is of a different shape (e.g., round, oval, etc.; not shown), then it is preferred that the border be at least about 25% rigid border, even more preferred is at least about 33% of the border, yet even more preferred is at least about 50% of the border and most preferred is at least about 75% of the border. In some embodiments, the border is about 100% rigid border. In some embodiments, the border is less than about 25% rigid border; in some embodiments the border is about 0% rigid border. In some embodiments (not shown), the device does not include a border; rather, the skeleton may be in a different shape, such as an X. In such an embodiment, the skeleton may comprise two arms, each arm running diagonally from one corner to an opposite corner (thereby forming an X). In another embodiment that does not include a border, the skeleton may be in the form of a cross or a plus-sign. In such an embodiment, the skeleton may comprise two arms, each arm running from the center (or off-center) of a side to the center (or off-center) of the opposite side (thereby forming a cross or a plus-sign). The skeleton may also be in any other shape that provides sufficient rigidity to the device to be easily handled and manipulated.

Figure 2:
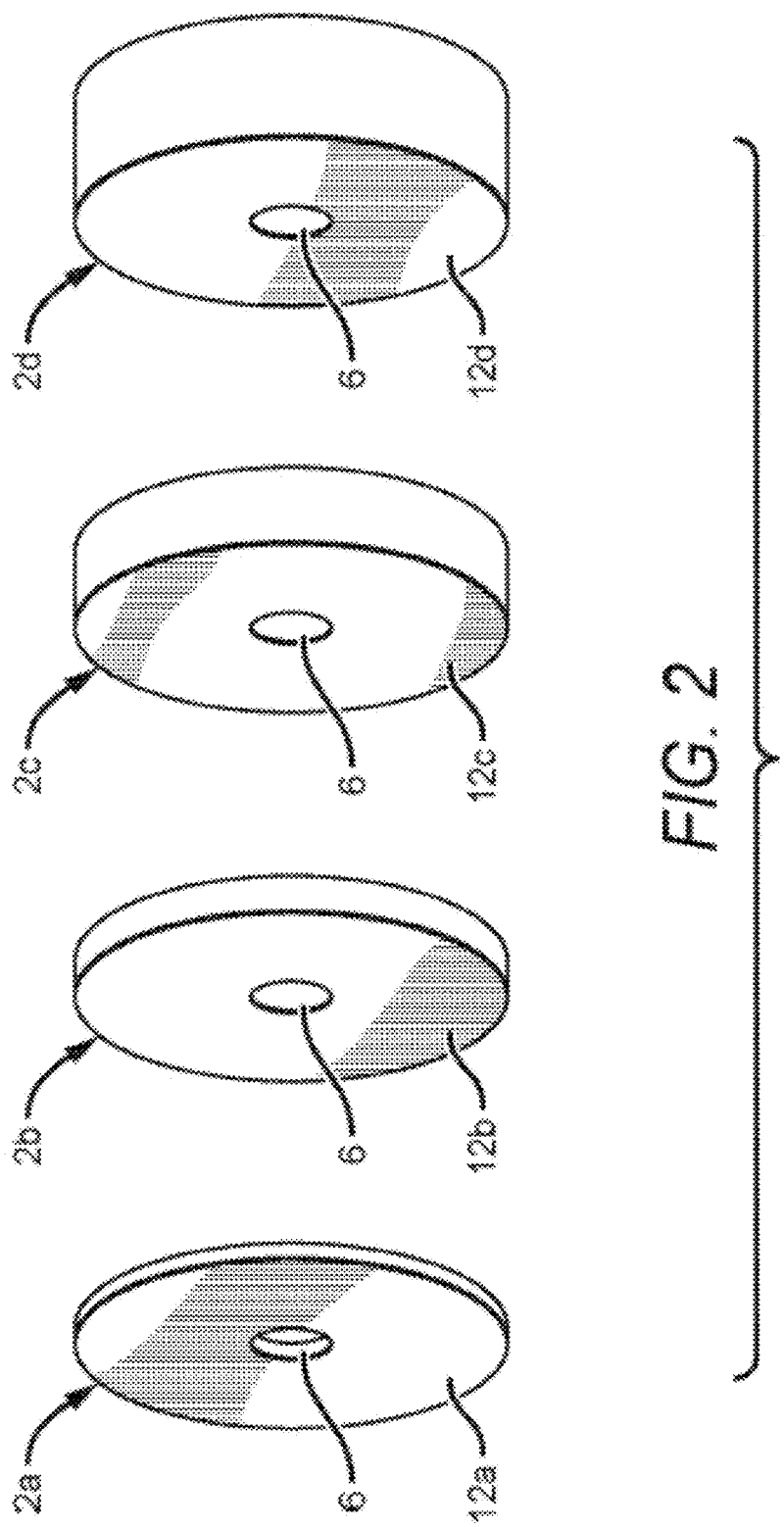
FIG. 2 is a view of four different embodiments of a pellet of the present disclosure.

As shown in FIG. 2, the pellets of the invention may be rounded or oval. While any shape is acceptable, it is preferred that corners (which may break off) be minimized or eliminated. Therefore, it is preferred that the pellets be in shapes that are rounded or have rounded corners. Each of the pellets in the device may be the same as, or different from, each other.

As also shown in FIG. 2, the pellets may be of varying thicknesses (2 a, 2 b, 2 c, 2 d) in order to provide for a device that can melt greater or lesser amounts of snow. While in some embodiments the pellets (2 a, 2 b, 2 c, 2 d) have flat faces (12 a, 12 b, 12 c, 12 d), in other embodiments the pellets may have three dimensional "faces" including convex and concave, as well as various textures. Therefore, the pellets may be spheres, cubes or other three-dimensional shapes.

Figure 4:
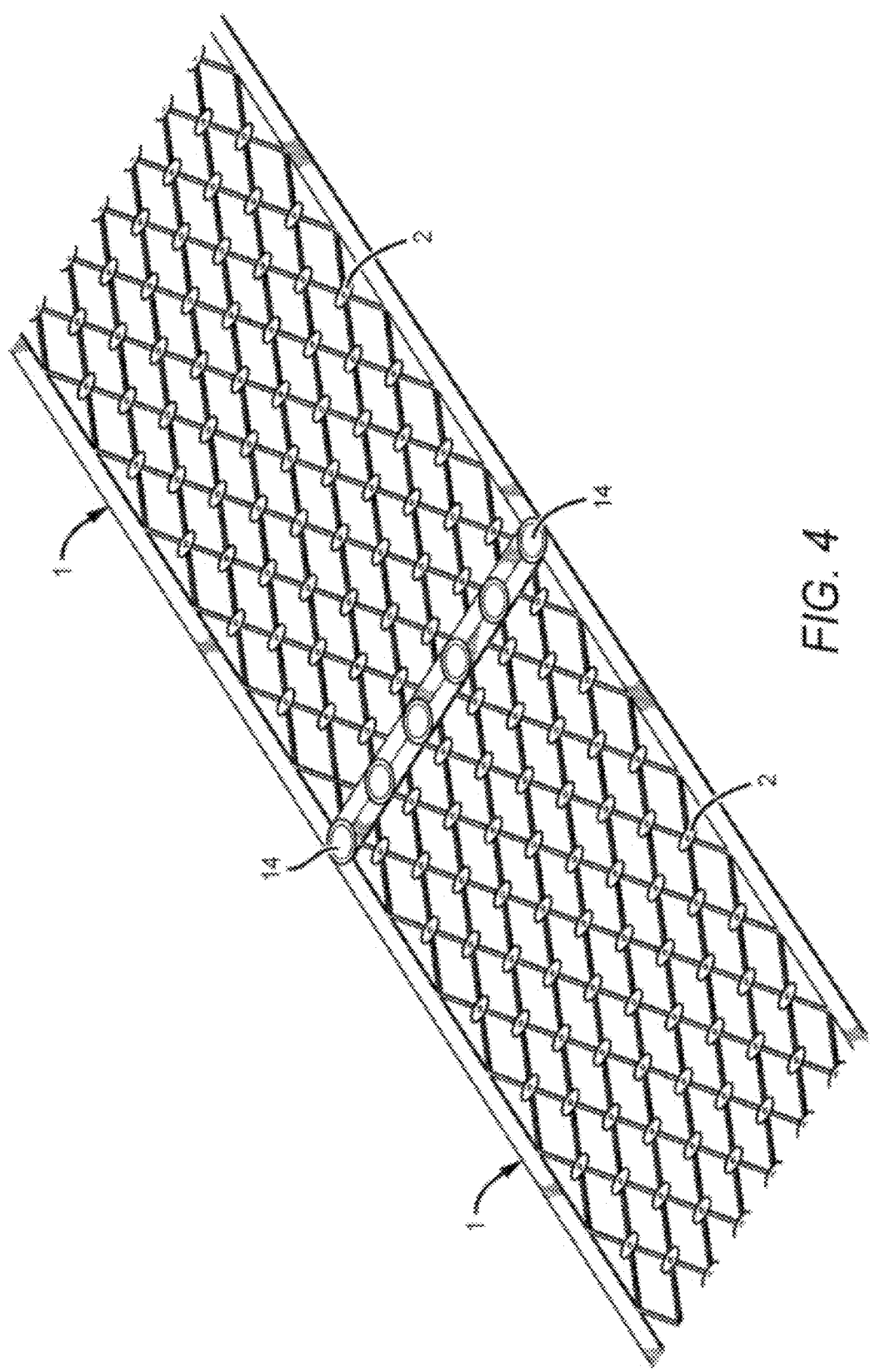
FIG. 4 is a perspective view of an embodiment of the present disclosure.

As shown in FIG. 4, two (or more) devices 1 may be connected together by perforations 14 to enable a user to easily select the desired size of the device. In some embodiments, the perforations 14 are not present, so a user can cut the device to the desired size. However, even in embodiments that include perforations 14, a user can cut the device at other locations in order to obtain a device of a desired size. While FIG. 4 shows perforations 14 on only one border, the perforations may also be on more than one border so that one device 1 is connected directly to two or more (not shown) devices 1. The perforations 14 also allow for the devices 1 to easily be folded on top of each other for placement into, e.g., a shipping box. The perforations 14 may be made in the border, whether rigid or not (not shown).

Figure 5:
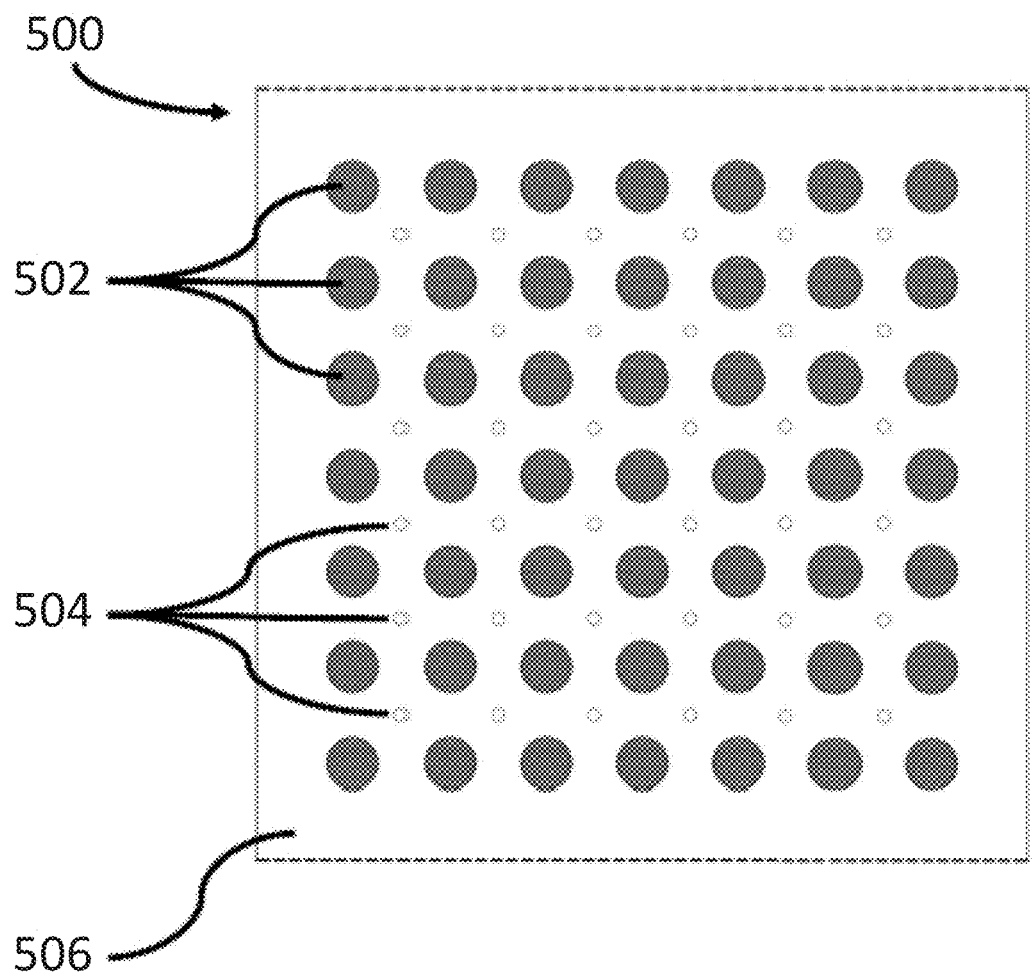
FIG. 5 shows a top view of a base sheet embodiment of the present disclosure.

As shown in FIG. 5, the present disclosure may include a base sheet embodiment 500. Such an embodiment may include a base sheet 506. The base sheet 506 may include a water-soluble substrate. The plurality of pellets may include pellets 502 which do not define a hole completely intersecting each pellet. The base sheet embodiment 500 may define at least one hole 504 to aid in dispersion of an active of the pellets 502. The holes 504 may be placed in a grid like pattern. However, the holes 504 may be placed in any arrangement. The diameter of the holes 504 may be less than the diameter of one of the pellets 502. Alternatively, the diameter of the holes may be any suitable size that allows for the passage of an active ingredient solution and known to those skilled in the art.

Figure 6:
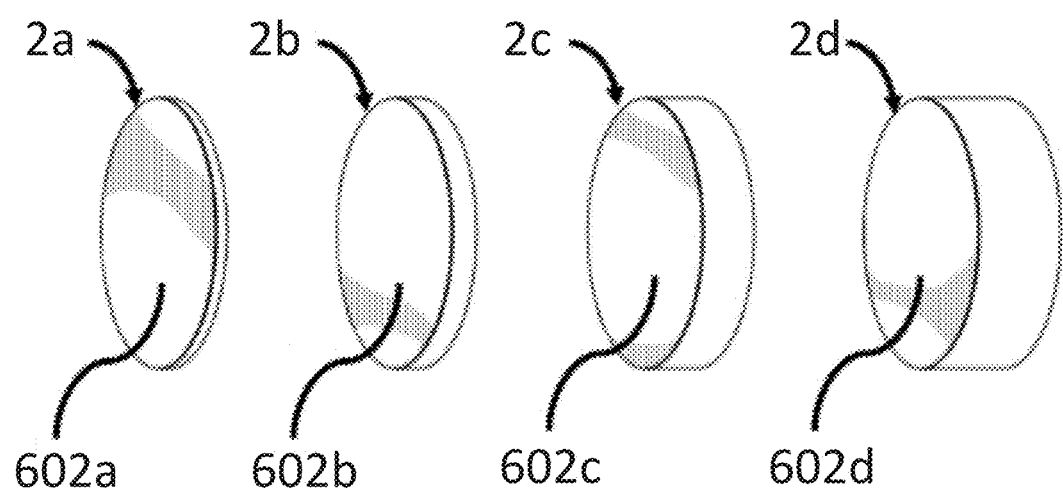
FIG. 6 is a view of four different embodiments of a pellet of the present disclosure.
Figure 7:
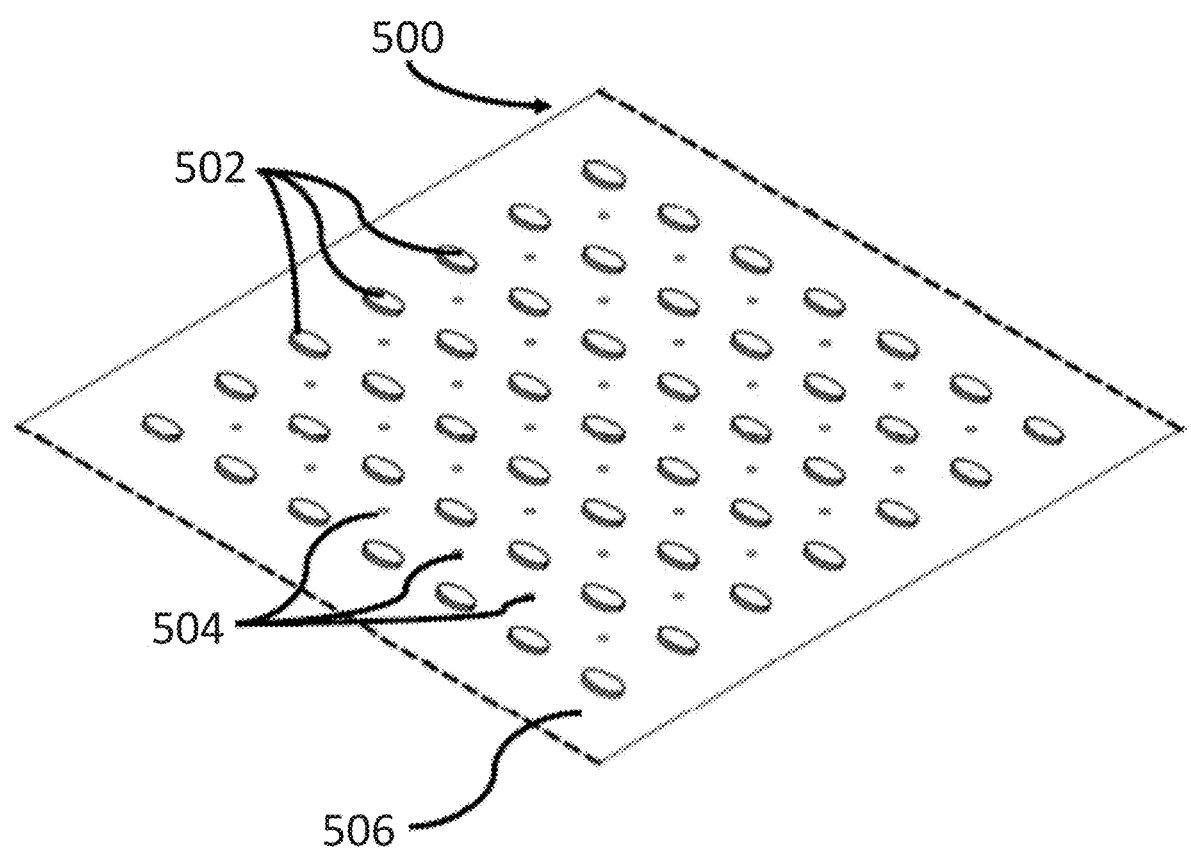
FIG. 7 is a perspective view of the embodiment of FIG. 5.

Turning to FIG. 6, each pellet may have a completely flat face 602a-d. However, the face of each pellet may have any of the earlier mentioned shapes such as concave or convex. The pellets in FIG. 6 may also have varying thicknesses 2a-d.

Figure 8:
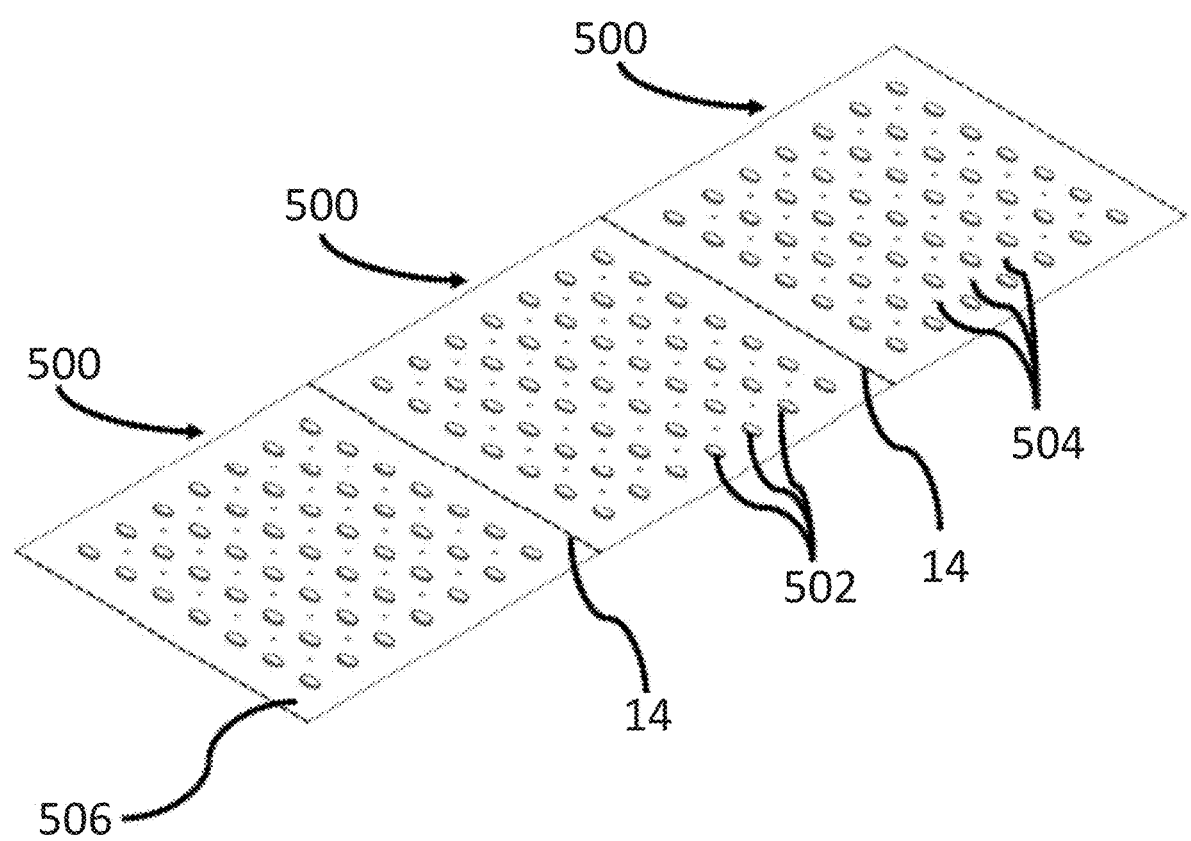
FIG. 8 is a perspective view of an embodiment of the present disclosure.

FIG. 8 shows more than one base sheet embodiment 500 removably attached by a perforated border 14. The perforated border may allow for individual base sheet embodiments 500 to be easily detached from one another. However, the base sheet 506 may be torn with sufficient force at a location away from the perforation 14.

Variations, modifications and alterations to the above detailed description will be apparent to those skilled in the art. All such variations, modifications and/or alternatives are intended to fall within the scope of the present invention, limited only by the appended claims.

All documents, patents and other literature referred to herein are incorporated by reference in their entirety.

The term "comprising" as used in the following claims is an open-ended transitional term that is intended to include additional elements not specifically recited in the claims. The term "consisting essentially of" as used in the following claims is a partially closed transitional phrase and is intended to include the recited elements plus any unspecified elements that do not materially affect the basic and novel characteristics of the claims. For example, an adhesive laminate (the outermost layer of the applied patch) embossed or printed with indicia would still be included in the meaning of "consisting essentially of", even if not specifically recited. The term "consisting of" as used in the following claims is intended to indicate that the claims are restricted to the recited elements.

Various measurements, such as amounts of ingredients and sizes, may be presented in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited.

For example, a size range of 1 to 10 inches should be interpreted to include not only the explicitly recited size limits of 1 and 10, but also to include individual sizes such as 2 inches, 3 inches, 4 inches, etc. as well as sub-ranges such as 2 to 6 inches, 4 to 7 inches, etc. This interpretation should apply regardless of the breadth of the range or the characteristic being described.

It should be noted that it is envisioned that any feature or element that is positively identified in this document may also be specifically excluded as a feature or element of an embodiment of the present invention.

What is claimed is:

1. A device for elevating the melting point of ice and snow, the device comprising:
   a plurality of pellets including an active ingredient, each pellet of the plurality of pellets having at least an underside and a topside;
   wherein the active ingredient is selected from the group consisting of chloride salts, organic compounds, alcohols or mixtures thereof; and
   a base including a water-soluble sheet attached to one of the underside or topside of each pellet of the plurality of pellets;
   wherein the base defines at least one hole through a top surface and bottom surface of the base allowing for easy dispersion of the active ingredient.

2. The device of claim 1, wherein each pellet of the plurality of pellets is thermally joined to the base.

3. The device of claim 1, wherein each pellet of the plurality of pellets is adhered to the base using an organic glue.

4. The device of claim 1, wherein each pellet of the plurality of pellets has a thickness, which increases along the base.

5. The device of claim 1, wherein each pellet of the plurality of pellets contains at least one color additive.

6. The device of claim 1, wherein the base has a border tracing at least one outside edge of the base.

7. The device of claim 6, wherein the border is flexible.

8. The device of claim 1, wherein the plurality of pellets contain at least one sugar excipient.

9. The device of claim 1, wherein the device has an internal support structure which enables a folded state wherein there are at least two layers of the base.

10. The device of claim 1, wherein the plurality of pellets is composed of at least one sugar excipient and a member selected from the chemical group with a crystalline structure including chloride salts, acetates, silicates, and formates.

11. The device of claim 10, wherein the crystalline structure is a polycrystalline structure that is capable of fragmenting, aiding in dispersion of the solid organic salt.

12. The device of claim 6, wherein the border comprises a plastic.

13. The device of claim 6, wherein the border comprises a water-soluble material.

14. The device of claim 6, wherein the border has an abrasive texture.

15. The device of claim 1, wherein the plurality of pellets is composed of granules, the granules aiding in runoff of the solid organic salt.

16. The device of claim 1, wherein the water-soluble material is less soluble than the plurality of pellets.

17. The device of claim 1, wherein each pellet of the plurality of pellets is supplemented with pH buffers tailored to keep a runoff between a pH of 5.5 and 8.5.

18. The device of claim 6, wherein the border is configured to be attached to a second border.

19. The device of claim 1, wherein the base includes at least one perforation, the at least one perforation enabling the user to select a desired size of the base.

20. The device of claim 1, wherein the plurality of pellets is composed of at least 5% Sugar and at most 95% Potassium Acetate.

* * * * *